US012679264B2

(12) United States Patent
Kwon et al.

(10) Patent No.: US 12,679,264 B2
(45) Date of Patent: Jul. 14, 2026

(54) ASSIST HANDLE FOR VEHICLE

(71) Applicant: DAEHAN SOLUTION CO., LTD, Incheon (KR)

(72) Inventors: Choong Ho Kwon, Seoul (KR); Young-Hoon Kim, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 295 days.

(21) Appl. No.: 18/644,633

(22) Filed: Apr. 24, 2024

(65) Prior Publication Data

US 2024/0359611 A1 Oct. 31, 2024

(30) Foreign Application Priority Data

Apr. 28, 2023 (KR) ........................ 10-2023-0055890

(51) Int. Cl.
B60N 3/02 (2006.01)

(52) U.S. Cl.
CPC .................................... B60N 3/026 (2013.01)

(58) Field of Classification Search
CPC .......... B60N 3/023; B60N 3/026; B60N 3/02; B60R 13/0212
USPC ....... 296/1.02, 214, 37.7, 37.8; 16/444, 438, 16/426
See application file for complete search history.

(56) References Cited

U.S. PATENT DOCUMENTS

| | | | | |
|---|---|---|---|---|
| 6,234,570 B1 * | 5/2001 | Quinno | ............... | B60R 13/0218 296/214 |
| 6,499,782 B2 * | 12/2002 | Kwon | .................... | B60N 3/026 296/214 |
| 7,611,162 B2 * | 11/2009 | Kim | .................... | B60R 11/0223 296/187.05 |
| 10,071,665 B2 * | 9/2018 | Ibrahim | ................. | H04R 1/028 |

(Continued)

FOREIGN PATENT DOCUMENTS

| | | | | |
|---|---|---|---|---|
| KR | 20030046243 A | * | 6/2003 | ............. B60N 3/026 |
| KR | 10-1658519 B1 | | 9/2016 | |

(Continued)

OTHER PUBLICATIONS

Translation KR-20030046243-A (Year: 2003).*

*Primary Examiner* — Amy R Weisberg
*Assistant Examiner* — Denise L. Esquivel
(74) *Attorney, Agent, or Firm* — Dickinson Wright PLLC

(57) ABSTRACT

An assist handle for a vehicle may be held by hand by mounting the assist handle on a roof panel in advance and then allowing the assist handle to be exposed to an interior by passing through a headliner when the headliner is mounted on the roof panel, thereby safely using the assist handle by firmly fixing the assist handle to a vehicle body and assembling the assist handle simply and conveniently by reducing the number of components. In particular, by form-ing a cover, which is opened or closed in a sliding manner or rotation manner, on a portion on which the assist handle is mounted of the headliner, the assist handle may maintain (Continued)

a built-in state when not used. In addition, by mounting a body in a vessel shape on a surface of the headliner and allowing the body to be forcibly fitted into the assist handle, it is possible to prevent the headliner portion from being lifted or deformed even when the assist handle is used by being held by hand, thereby conveniently using the assist handle.

4 Claims, 7 Drawing Sheets

(56)               References Cited

U.S. PATENT DOCUMENTS

| | | | |
|---|---|---|---|
| 10,399,476 B2 * | 9/2019 | Ranganathan | B60R 7/04 |
| 11,548,426 B2 * | 1/2023 | Zarraga | B60N 3/026 |
| 2011/0221172 A1 * | 9/2011 | She | B60R 13/025 |
| | | | 296/187.05 |
| 2012/0222360 A1 * | 9/2012 | Schryer | E05B 85/12 |
| | | | 49/460 |
| 2019/0232877 A1 * | 8/2019 | Ranganathan | B60R 7/082 |

FOREIGN PATENT DOCUMENTS

| | | | |
|---|---|---|---|
| KR | 10-1668406 B1 | 10/2016 | |
| KR | 10-2018-0105280 B1 | 9/2018 | |

* cited by examiner

H

A

ASSIST HANDLE FOR VEHICLE

CROSS-REFERENCE TO RELATED APPLICATION

This application claims priority to and the benefit of Korean Patent Application No. 10-2023-0055890, filed on Apr. 28, 2023, the disclosure of which is incorporated herein by reference in its entirety.

BACKGROUND

1. Field of the Invention

The present invention relates to an assist handle for a vehicle, and more specifically, to an assist handle for a vehicle, in which a handle may be fixed to a vehicle body, such as a roof panel, and allow a holding portion of the handle to be used in a vehicle interior by passing through a headliner as the headliner is assembled to the roof panel, thereby firmly assembling and safely and conveniently using the assist handle, reducing costs due to a simple configuration, and providing a comfortable interior environment by preventing the occurrence of abnormal sounds caused by various assembled components. In this case, since the handle has a cover, which makes the handle invisible in the vehicle interior, at a place at which the assist handle is mounted, it is possible to improve the aesthetic sense and appearance of the vehicle interior when the assist handle is not used.

2. Discussion of Related Art

In general, as shown in FIGS. 1 to 3, an assist handle is installed on a headliner H installed to face a roof panel in a vehicle interior. The assist handle may not only allow passengers to take a stable posture by holding the handle by hand when a vehicle travels, but also help people who have difficulty in riding to ride conveniently and safely by holding the handle by hand.

In Patent Documents 1 to 3 below, technologies related to such an assist handle (auxiliary handle) are disclosed.
(Patent Document 1) Korean Patent No. 10-1658519

Patent Document 1 is directed to providing a fixture for mounting an auxiliary handle for a vehicle, which may be easily mounted using a small amount of force when mounting the fixture and, in some cases, may be easily removed using a small amount of force when removing the fixture. In particular, Patent Document 1 is also directed to providing a fixture for mounting an auxiliary handle for a vehicle, which may allow the auxiliary handle to be mounted or removed using a small amount of force by changing widths, areas, heights, or the like of components of the fixture for manufacturing the form of one panel using a method, such as press machining, and stably maintain a fixed state of the auxiliary handle.
(Patent Document 2) Korean Patent Application Laid-Open No. 10-2018-0105280

Patent Document 2 is directed to providing an assist handle fixture for a vehicle, which may be configured so that a base is in point contact with an installation bracket after the assist handle is assembled in a gap formed between the base and the installation bracket of the fixture to be used as an assembly space in which the auxiliary handle may be easily fixed by the fixture, thereby allowing the assist handle to be easily assembled using the gap as the assembly space upon assembling and eliminating the movement of the base, the installation bracket, and the like after assembling to suppress the occurrence of noise, such as abnormal sounds, and increase riding comfort. In particular, by further forming a compression protrusion protruding from the base at a height that is substantially the same as the gap, it is possible to use the gap as the assembly space as described above and also suppress the occurrence of noise in the gap.
(Patent Document 3) Korean Patent No. 10-1668406

Patent Document 3 relates to an assist handle for a vehicle with improved operability and assemblability and may include a handle, a base, and a damper unit. Here, the base is rotatably coupled to both end portions of the handle by a pin. In addition, the damper unit includes a housing fixedly coupled to any one of the bases and an insert provided inside the housing to decrease a rotational force of the handle by pressing the pin, which rotates in conjunction with the handle upon rotation of the handle, in a central direction. In addition, the housing includes a first body portion in a cylindrical shape, and a stopper that constrains the insert formed to extend from both end portions of the first body portion in a center direction and inserted into the first body portion, and the insert includes a second body portion formed with a hole formed to pass therethrough in an axial direction so that the insert inserted into the first body portion presses the pin and a coupling part which is formed at both end portions of the second body portion and to which the stopper is coupled.

RELATED ART DOCUMENTS

Patent Documents (Patent Document 1) Korean Patent No. 10-1658519 (registered date: Sep. 12, 2016)
(Patent Document 2) Korean Patent Application Laid-Open No. 10-2018-0105280 (published date: Sep. 28, 2018)
(Patent Document 3) Korean Patent No. 10-1668406 (registered date: Oct. 17, 2016)

SUMMARY OF THE INVENTION

However, the following problems occur in the conventional assist handles.

(1) Since the assist handle and the installation bracket are assembled integrally using the module clip and the like based on the headliner, the configuration of assembling the assist handle is complicated, and it is difficult to assemble the assist handle.

(2) In addition, as the number of components increases as described above, the number of connecting portions also increases, and thus when a force is applied after holding the handle by hand, torsion occurs between the components to cause abnormal sounds, which acts as one factor that spoils a comfortable environment of the vehicle interior.

(3) As the assist handle is mounted on the headliner in the form of the module as described above, when a strong force is applied to the assist handle, there is the possibility that a strong external force is applied to the connecting portions or the module portion, thereby causing damage to the connecting portions or the module portion.

(4) In addition, as the assist handle includes various components, when the assist handle is not sequentially assembled in the assembling process, the assist handle is not properly assembled ultimately when the headliner is assembled, or the assist handle may be easily detached or separated even when assembled completely, thereby causing noise.

The present invention is directed to providing an assist handle for a vehicle, which may be held by hand by mounting the assist handle on a roof panel in advance and then allowing the assist handle to be exposed to an interior by passing through a headliner when the headliner is mounted on the roof panel, thereby safely using the assist handle by firmly fixing the assist handle to a vehicle body and simply and conveniently assembling the assist handle while reducing the number of components.

In particular, the present invention is also directed to providing an assist handle for a vehicle, which may include a cover to be opened or closed in a sliding manner or a rotation manner using a hinge on a portion on which the assist handle is mounted of the headliner to allow the assist handle to maintain a built-in state when not used, thereby improving the aesthetic sense and appearance of the vehicle interior.

In addition, the present invention is directed to providing an assist handle for a vehicle, which is formed such that a body in a vessel shape is mounted on a headliner surface facing a roof panel and forcibly fitted into the assist handle, thereby preventing the headliner portion from being lifted or deformed even when the assist handle is held and used by hand.

An assist handle for a vehicle according to the present invention includes a handle (100) of which at least one of both ends is fixed to a roof panel (R) and a holding portion used by being held by hand installed to pass through and fitted into a portion (S) formed on a headliner (H), a body (200) formed in a vessel shape, installed to surround the portion (S) on a surface of the headliner (H) installed to face the roof panel (R), and having an insertion hole (220) formed in an inner surface thereof to allow the holding portion to be inserted and accommodated therein, and at least one finishing member (300) fixed by being forcibly fitted into the handle (100) or mounted on a surface of the body (200) to finish the insertion hole (220), wherein at least one fixing protrusion (110) is formed to protrude from the handle (100), and a fixing groove (210) is formed in the body (200) and forcibly fitted onto and assembled with the fixing protrusion (110) as the headliner (H) is assembled to face the roof panel (R).

In particular, the handle (100) may be formed in a "⌐⌐" shape, both ends thereof may be fixedly supported by the roof panel, and fixing protrusions (110) may be formed one-to-one on outer surfaces of both sides facing each other, and fixing grooves (210), which are formed one-to-one at both sides of the insertion hole (220) into which the handle (100) is inserted, may be formed in the body (200) and forcibly fitted onto the fixing protrusion (110).

In addition, a cover (230) may be installed on the portion (S) to be opened or closed in a sliding manner or rotation manner using a hinge so that the handle (100) is exposed to prevent the handle 100 from being exposed to a vehicle interior when the handle (100) is not used.

BRIEF DESCRIPTION OF THE DRAWINGS

A set of FIG. 6A

DETAILED DESCRIPTION OF EXEMPLARY EMBODIMENTS

Figure 1:
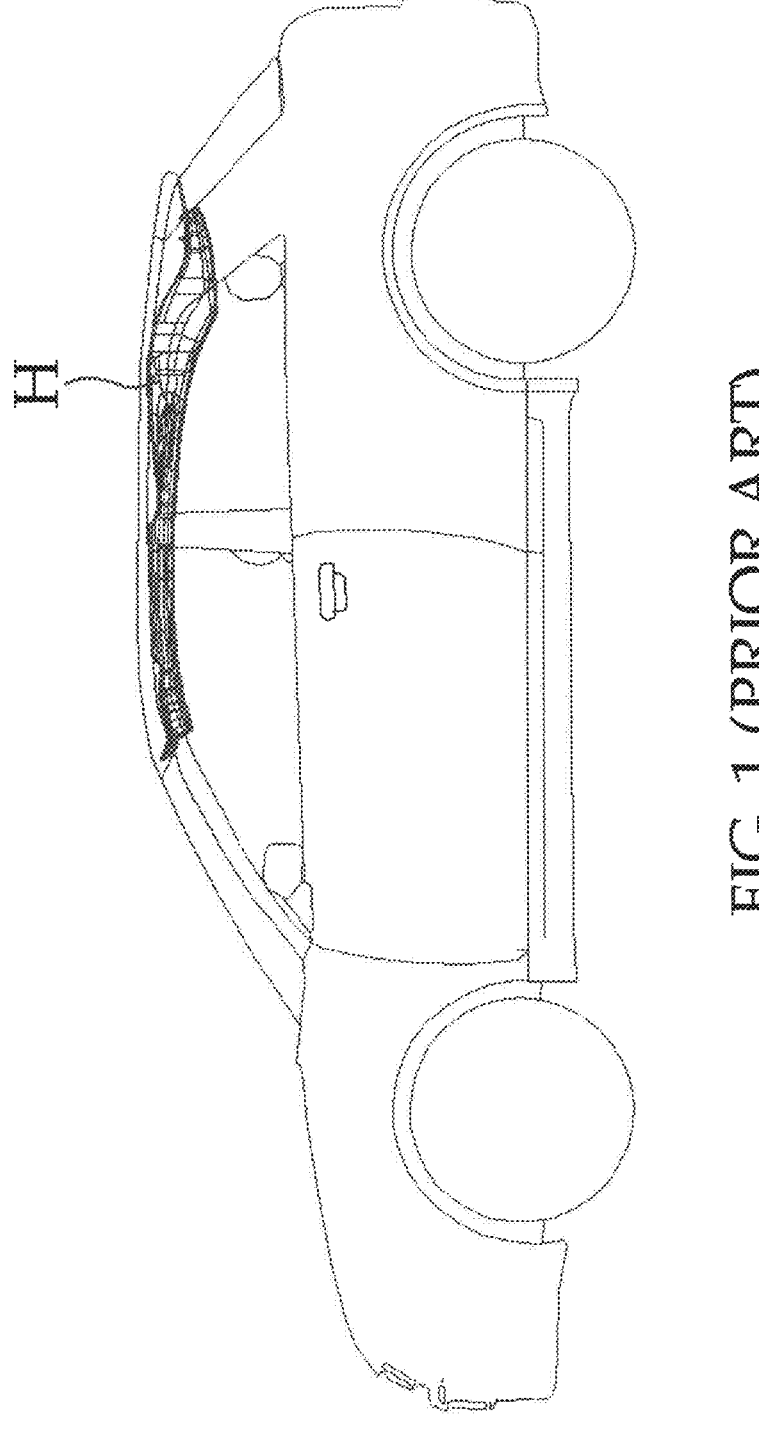
FIG. 1 is a side view showing a vehicle in which a conventional headliner on which an assist handle for a vehicle is mounted.
Figure 2:
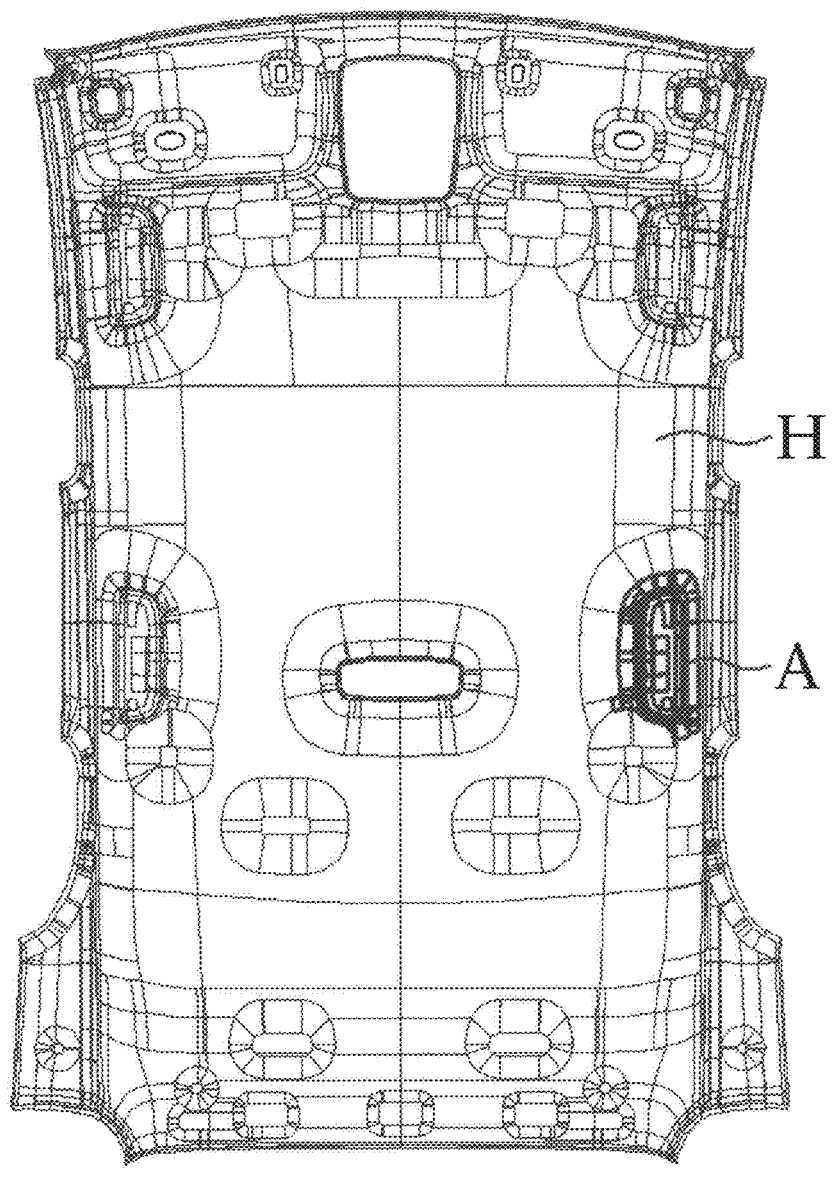
FIG. 2 is a plan view showing the conventional headliner on which the assist handle for a vehicle is mounted.
Figure 3:
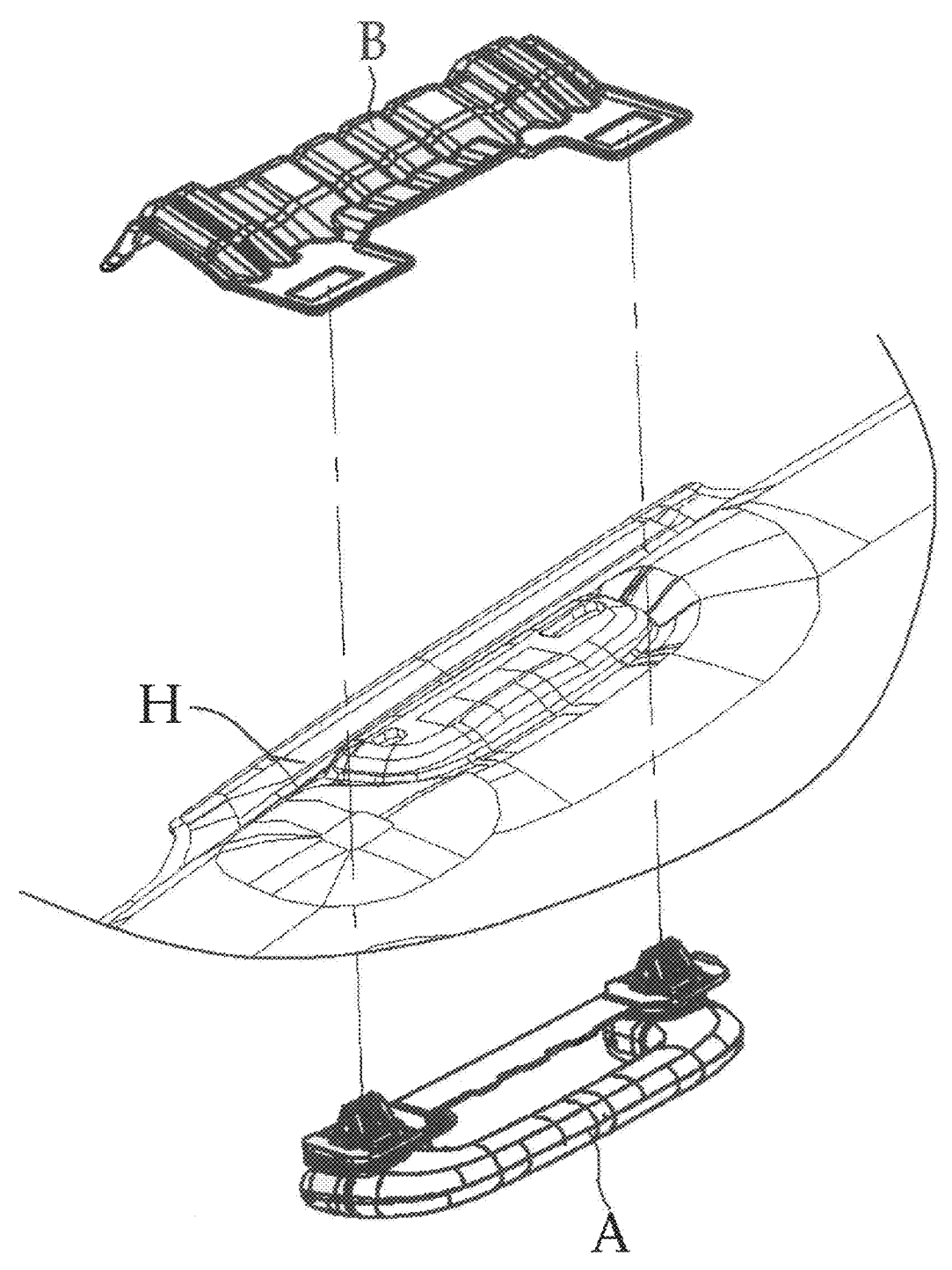
FIG. 3 is an exploded perspective view showing a state before an installation bracket located above the conventional headliner for a vehicle and a handle located thereunder are assembled to be a clip module.

Hereinafter, exemplary embodiments according to the present invention will be described in detail with reference to the accompanying drawings. Prior to the description, the terms or words used in the specification and claims should not be construed as being limited to their usual or dictionary meanings and should be construed as meaning and concept consistent with the technical spirit of the present invention according to a principle in which the inventors can appropriately define the concept of the terms in order to describe their inventions in the best method.

Therefore, since the embodiments described in the specification and the configurations illustrated in the drawings are only the most exemplary embodiment of the present invention and do not represent all of the technical spirit of the present invention, it should be understood that various equivalents and modified examples capable of replacing the embodiments and the configurations may be present at the time of this application.

[Configuration of Assist Handle for a Vehicle]

Figure 4:
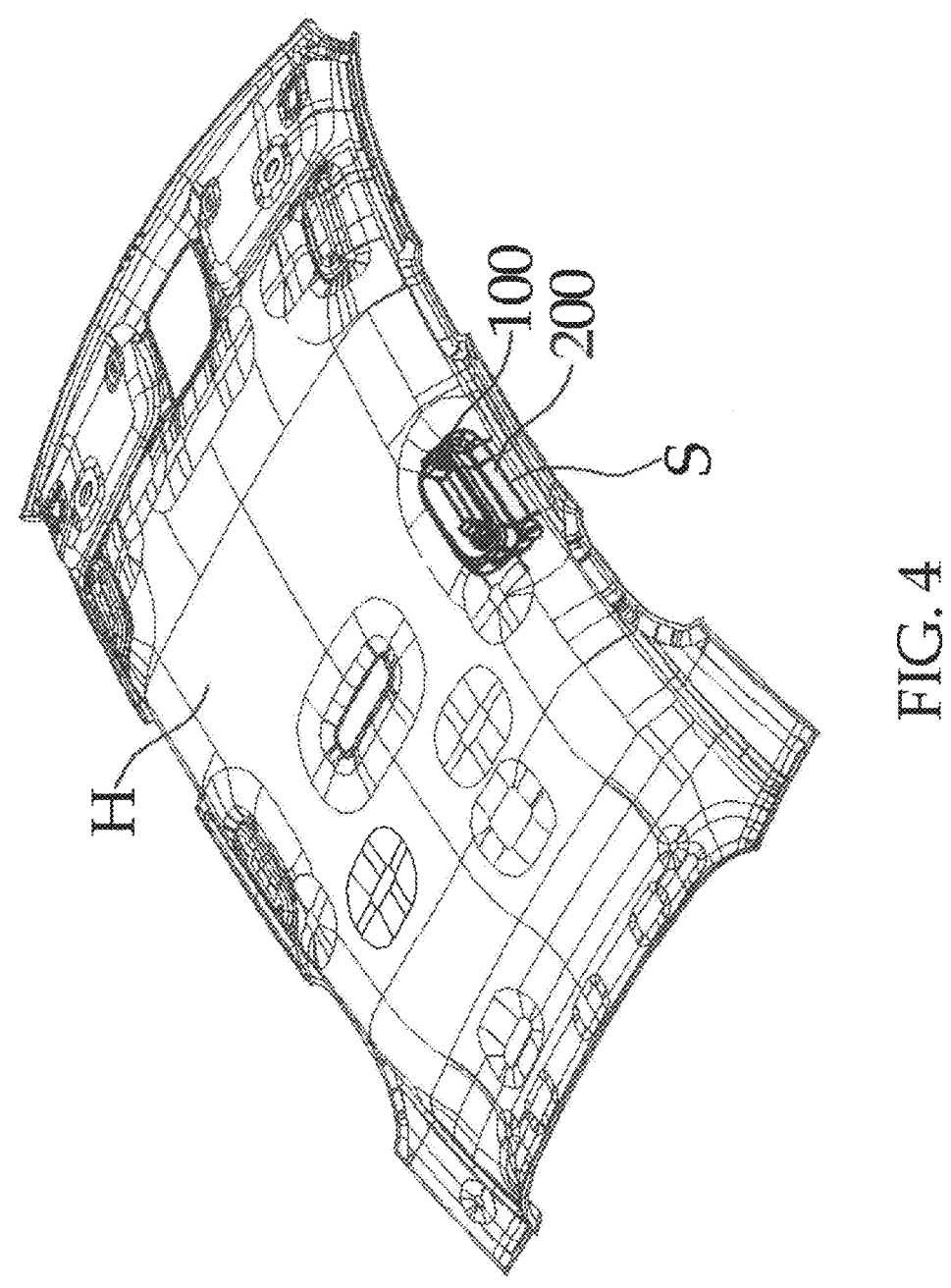
FIG. 4 is a perspective view showing a headliner on which an assist handle for a vehicle according to the present invention is mounted.
Figure 5:
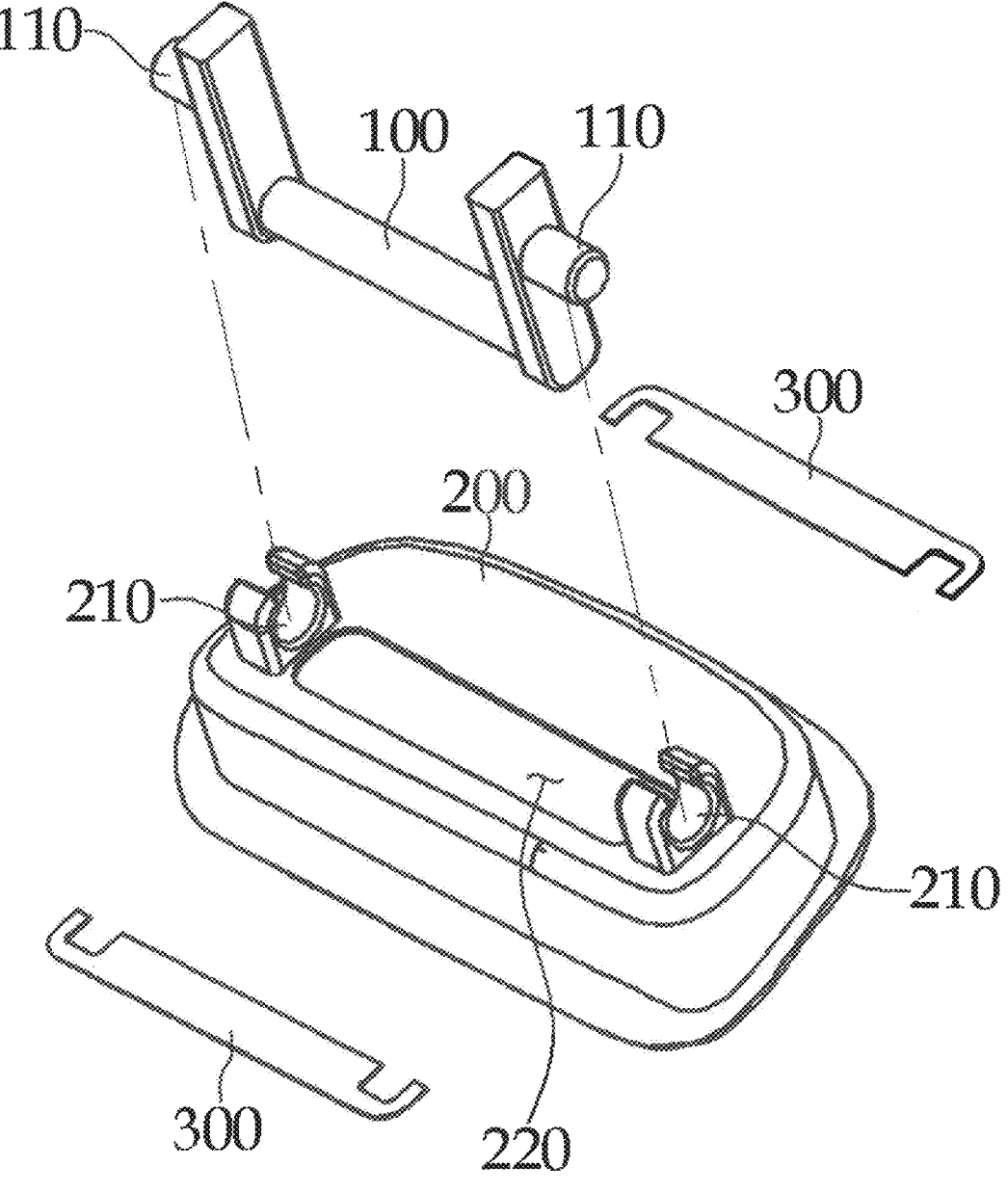
FIG. 5 is an exploded perspective view showing a configuration of the assist handle for a vehicle according to the present invention.
Figure 6A:
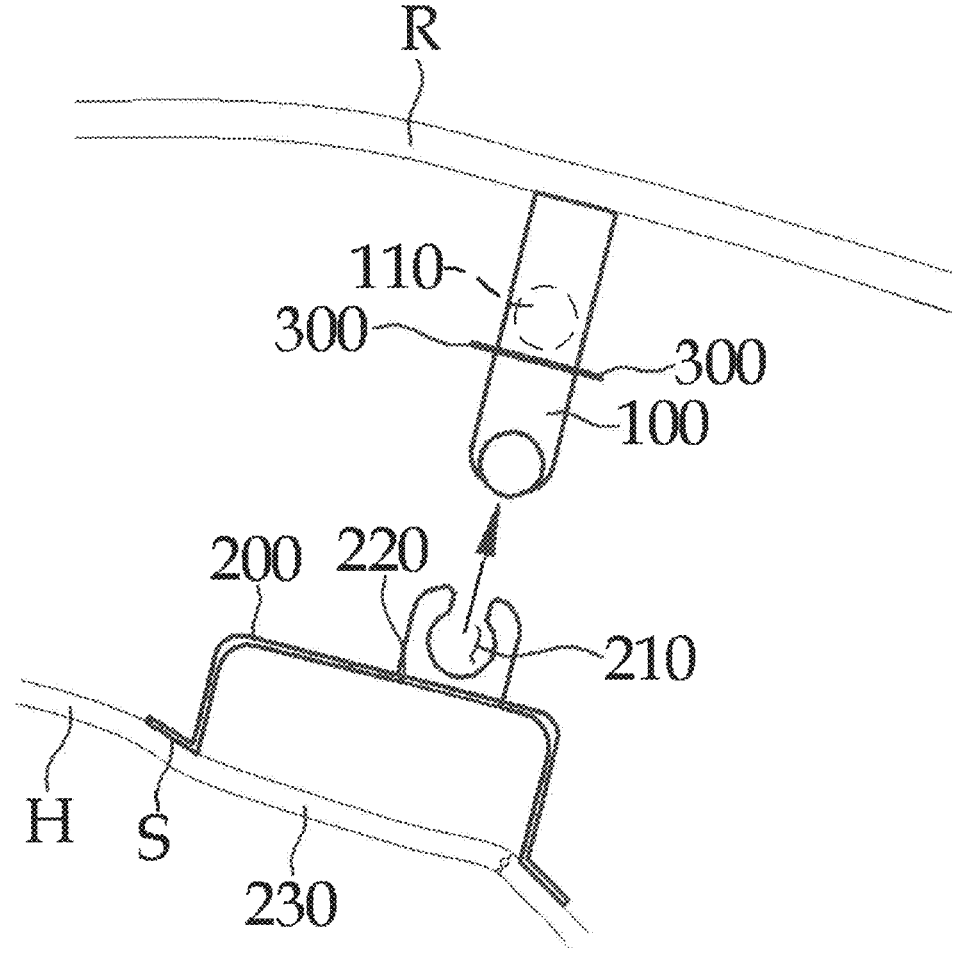
FIG. 6B is a schematic diagram showing a state (see FIG. 6B) in which the assembly of the assist handle is finished by assembling the headliner in a state (see FIG. 6A) in which the handle according to the present invention is fixed to a vehicle body.
Figure 6B:
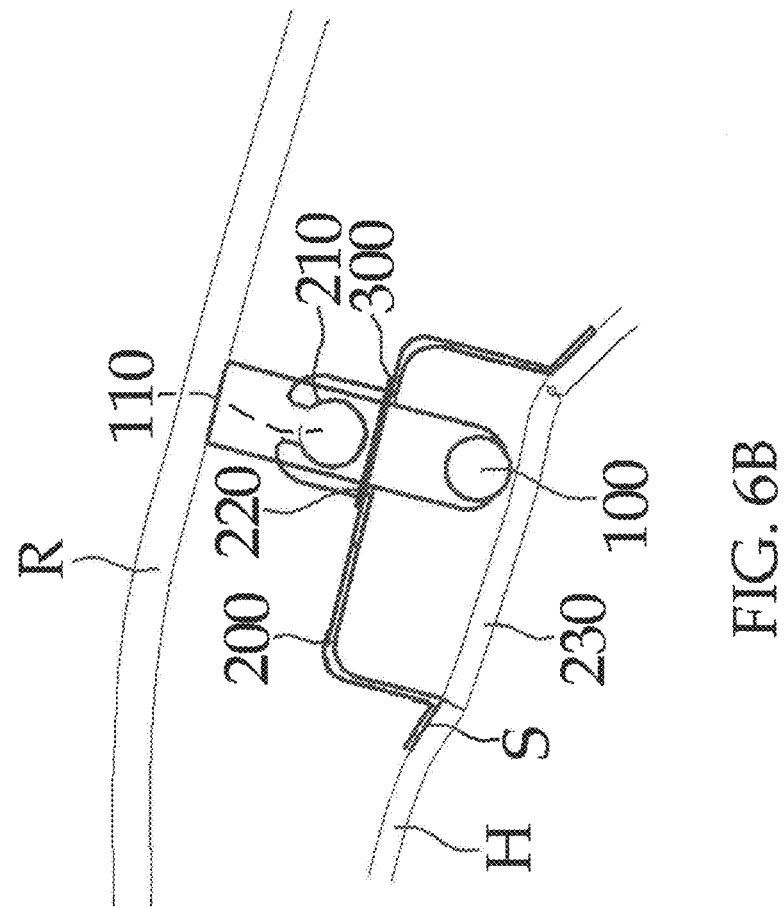

As shown in FIGS. 4 to 6, an assist handle for a vehicle according to the present invention includes a handle 100, a body 200, and a finishing member 300.

In particular, as a headliner H is mounted on a roof panel R in a state in which at least one of both sides of the handle 100 is fixed to the roof panel R, the handle 100 may be used in a vehicle interior by allowing a holding portion of the handle 100 used by being held by hand to pass through headliner H, and thus the handle 100 may be used in a state of being fixed to a vehicle body. Therefore, it is possible to more firmly and fixedly support the assist handle and simply and easily assemble the structure of the assist handle, thereby using the assist handle conveniently and stably.

In this case, the handle 100 may be manufactured in a "⌐⌐" shape, and both sides thereof may be fixedly supported by the roof panel R to be fixedly supported more firmly.

In addition, since fixing protrusions 110 are formed at both sides of the handle 100 and fixing grooves 210 are formed to be forcibly fitted onto the fixing protrusions 110 when the headliner H is assembled to the roof panel R in the body 200 installed on a surface of the headliner H facing the roof panel R in order to fixedly support the handle 100, it is possible to prevent the headliner H portion on which the handle 100 is mounted from being bent or deformed by an external force, thereby improving the quality of the headliner H.

Lastly, a cover 230 is mounted on a portion S that covers the body 200 on which the handle 100 is mounted to finish an inlet portion of the portion S when the handle 100 is not used, thereby allowing the handle 100 to maintain a built-in state in which the handle 100 is not exposed to the vehicle interior.

Hereinafter, such a configuration will be described in more detail with reference to the accompanying drawings as follows. Here, the reference numeral "R" denotes the roof panel, "H" denotes the headliner installed to face the roof panel, and "S" denotes the portion formed on the headliner to mount the assist handle.

A. Handle

As shown in FIGS. 4 to 6, the handle 100 is mounted to allow passengers to hold the handle by hand.

In particular, as shown in FIG. 6, since at least one of both ends of the handle 100 is fixed to the roof panel R, the handle 100 may be directly and firmly fixed to the vehicle body, and it is possible to minimize the number of components required for fixing the handle to the headliner H. The drawings show a state in which both sides of the handle 100 are fixed to the roof panel R by welding.

Meanwhile, as shown in FIGS. 4 to 6, the handle 100 is for using the holding portion in the vehicle interior by allowing a portion (holding portion used by being held by a passenger's hand) protruding from the roof panel R to pass through the headliner H. To this end, a through hole is formed in the portion S of the handle 100 formed to mount the assist handle of the headliner H. In addition, in the case of assembling the headliner H while moving the headliner H upward in the vehicle interior in order to assemble the headliner H to the roof panel R, when the holding portion of the handle 100 is accommodated in the body 200 to be described below by passing through the headliner H through the through hole, the holding portion may also be used in the vehicle interior.

In this case, as shown in FIG. 6, it is preferable to prevent the handle 100 from spoiling the aesthetic sense and appearance of the vehicle interior by forming the holding portion of the handle 100 passing through the headliner H within the portion S formed on the headliner H to mount the assist handle.

In addition, in the exemplary embodiment of the present invention, as shown in FIG. 6, the cover 230 may be additionally formed on the portion S. In this case, a guide is formed at an edge of the portion S of the cover 230, and the cover 230 may be opened or closed by being guided by the guide, or an opening and closing member, such as an elastic support hinge, is mounted on the edge of the portion S and the cover 230 may be used through rotation.

As shown in FIGS. 5 and 6, at least one fixing protrusion 110 that may allow the handle to be fixed to the body 200 to be described below is formed on the handle 100. Here, the handle 100 may be manufactured in a "⎿⏌" shape, and both ends thereof are welded to the roof panel R and firmly fixed to the vehicle body to use the handle 100, and in this case, two fixing protrusions 110 are formed. In other words, by forming one fixing protrusion 110 at each of both sides facing each other of the handle 100, when the headliner H is assembled to the roof panel R in a state in which the handle 100 is fixed to the roof panel R as described above, the body 200 to be described below is forcibly fitted onto the two fixing protrusions 110 to assemble the body 200, thereby more firmly and fixedly supporting the roof panel R and the headliner H while constantly maintaining a distance between the roof panel R and the headliner H.

B. Body

As shown in FIGS. 4 to 6, the body 200 is formed in a vessel shape and mounted on the surface of the headliner H facing the roof panel R. In this case, the body 200 is mounted on the surface of the headliner H to cover the portion S of the headliner H formed to mount the assist handle.

In this case, as shown in FIGS. 5 and 6, an insertion hole 220 is formed to pass through an inner surface of the body in the vessel shape. The insertion hole 220 is a hole that allows the holding portion of the handle 100 fixed to the roof panel R in advance when the headliner H is assembled to the roof panel R to be exposed to the surface of the portion S, that is, the vehicle interior, through the insertion hole 220 so that the passenger may hold the holding portion.

In addition, as shown in FIGS. 5 and 6, the fixing grooves 210 are formed at locations facing the fixing protrusions 110 of the body 200. The reason is that when the headliner H is assembled to the roof panel R, the headliner H may be stably fixed by forcibly fitting the fixing groove 210 onto the fixing protrusion 110, and the headliner H portion may be stably supported without distortion or shaking, when the assist handle is used, by maintaining the constant distance between the headliner H and the roof panel R.

C. Finishing Member

As shown in FIGS. 5 and 6, the finishing member 300 is a member that is forcibly fixed by being inserted into the handle 100 or mounted on the surface of the body 200 to finish the insertion hole 220, thereby preventing a gap between the body 200 and the roof panel R from being exposed to the vehicle interior.

The finishing member 300 may be formed as one component, but as shown in FIGS. 5 and 6, two finishing members 300 may be formed symmetrically and used to finish the insertion hole 220 by being easily fitted into the handle 100 or directly finish the insertion hole 220 by being mounted on the body 200.

As described above, according to the present invention, by integrally fixing the assist handle to the vehicle body, such as the roof panel, using a method such as welding, the assist handle may be safely used by being firmly installed and may also be easily assembled in a simple structure, thereby preventing the occurrence of abnormal sounds that may be caused by an increase in the number of components.

An assist handle for a vehicle according to the present invention has the following effects.

(1) Since the handle fixed to a vehicle body such as a roof panel is used, the handle can be installed firmly and used safely.

(2) Since the handle is directly fixed to the vehicle body as described above, components, such as a clip module and an installation bracket, for fixing the handle to a headliner do not need to be used, and thus it is possible to simplify a structure and reduce manufacturing costs.

(3) In addition, in a case in which the headliner is assembled to a roof panel in a state in which the handle is fixed to the vehicle body, when a holding portion of the handle passes through and assembled with the headliner, the handle can be immediately used, easily assembled, and used safely and conveniently after assembled.

(4) Meanwhile, when the body is mounted on a surface of the headliner facing the roof panel and the headliner is assembled to the roof panel, the holding portion of the handle is accommodated in the body by passing through the body, and thus it is possible to secure a space in which the holding portion can be used through the body and obtain the finishing effect.

(5) In this case, as a fixing groove is formed in the handle to be forcibly fitted onto a fixing protrusion when the headliner is assembled to the roof panel, it is possible to obtain the same effect that the headliner and the handle are integrated via the body when the headliner is assembled, thereby safely and conveniently using the handle.

(6) Lastly, by mounting a cover on a portion of the headliner on which the handle is mounted to allow an inlet portion of the place to be finished with the cover when the handle is not used, it is possible to improve the aesthetic sense and appearance of the vehicle interior.

What is claimed is:

1. An assist handle for a vehicle, comprising:

a handle (100) of which at least one of both ends is fixed to a roof panel (R) and a holding portion used by being held by hand is installed to pass through and fitted into a portion (S) formed on a headliner (H);

a body (200) formed in a vessel shape, installed to surround the portion (S) on a surface of the headliner (H) installed to face the roof panel (R), and having an insertion hole (220) formed in an inner surface thereof to allow the holding portion to be inserted and accommodated therein; and at least one finishing member (300) fixed by being forcibly fitted into the handle (100) or mounted on a surface of the body (200) to finish the insertion hole (220), wherein at least one fixing protrusion (110) is formed to protrude from the handle (100), and a fixing groove (210) is formed in the body (200) and forcibly fitted onto and assembled with the fixing protrusion (110) as the headliner (H) is assembled to face the roof panel (R).

2. The assist handle of claim 1, wherein the handle (100) is formed in a "⎣⎤" shape, both ends thereof are fixedly supported by the roof panel, and fixing protrusions (110) formed one-to-one on outer surfaces of both sides facing each other, and fixing grooves (210), which are formed one-to-one at both sides of the insertion hole (220) into which the handle (100) is inserted, are formed in the body (200) and forcibly fitted onto the fixing protrusions (110).

3. The assist handle of claim 2, wherein a cover (230) is installed on the portion (S) to be opened or closed in a sliding manner or rotation manner using a hinge so that the handle (100) is exposed to prevent the handle 100 from being exposed to a vehicle interior when the handle (100) is not used.

4. The assist handle of claim 1, wherein a cover (230) is installed on the portion (S) to be opened or closed in a sliding manner or rotation manner using a hinge so that the handle (100) is exposed to prevent the handle 100 from being exposed to a vehicle interior when the handle (100) is not used.

* * * * *